UNITED STATES PATENT OFFICE.

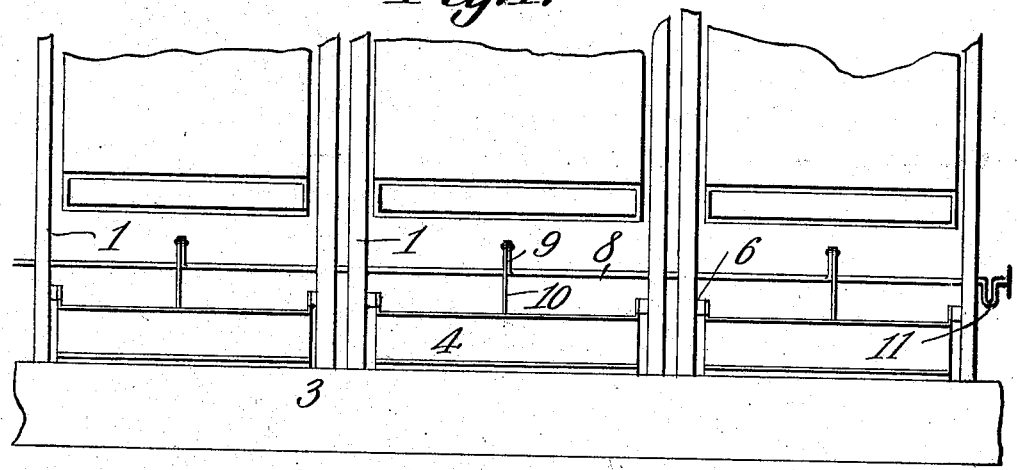

HENTON L. STORY, OF VON ORMY, TEXAS.

COTTON-GIN ATTACHMENT.

No. 918,710.   Specification of Letters Patent.   Patented April 20, 1909.

Application filed May 4, 1908. Serial No. 430,837.

*To all whom it may concern:*

Be it known that I, HENTON L. STORY, a citizen of the United States, residing at Von Ormy, in the county of Bexar and State of Texas, have invented a new and useful Cotton-Gin Attachment, of which the following is a specification.

This invention has relation to seed delivery chutes for cotton gins and it consists in the novel construction and arrangement of parts hereinafter shown and described.

The object of the invention is to provide a chute adapted to be used in combination with a cotton gin or a gang of cotton gins for the purpose of delivering seeds from the gin or gins into any one of a pair of conveyers.

The chute consists primarily of a body which is adapted to be attached to the base of the framework of the gin and said body is provided in its bottom with a fixed section and a hinged section. Means is provided for swinging the hinged section so that it may occupy the same plane as that occupied by the fixed section, and when in this position the chute is adapted to deliver the seed from the gin into one of the conveyers. When the said hinged section is swung to a different plane than that occupied by the fixed section the seed as it falls from the gin passes upon the said hinged section and from the said hinged section is delivered into the other conveyer. Means is provided for swinging the said hinged sections of several gins simultaneously so that the delivery from a gang of gins may be by one operation directed into one or other of the conveyers. A plurality of conveyers is used for the reason that the seed that is retained by the gin mill passes into one conveyer while the seed that goes to the customer is passed into the other conveyer and frequently during the operation of the gin it is desirable to change the course of the seed so that they may be apportioned to their respective owners.

In the accompanying drawings:—Figure 1 is a front elevation of the lower portions of several gins with the attachment applied thereto. Fig. 2 is a sectional view of the attachment showing the parts in one position. Fig. 3 is a sectional view of the attachment showing the parts in another position. Figs. 4 and 5 are detail views showing modified forms of handle used upon the attachment.

Similar numerals of reference are employed to indicate corresponding parts throughout the several figures of the drawings.

Before entering into a detailed description of the construction of the seed chute it is deemed advisable to explain in a general way the arrangement of the base of the gin and the conveyers above mentioned.

1 represents the base of the frame of the gin and 2 and 3 represent parallel conveyers which are substantially at the same level. One of the said conveyers is designed to operate upon the seed which becomes the property of the gin mill, while the other conveyer is adapted to operate upon the seed which is conveyed to the receptacle and delivered to the customer. The chute consists of a pan body 4 which is provided with a fixed bottom section 5 and the said bottom section 5 is disposed toward the conveyer 2. The arms 6 are attached at their outer ends to the sides of the pan body 4 and at their inner ends to the uprights of the frame 1. The bottom section 7 is hinged to the fixed bottom section 5 at the point 8'. Said section 7 is equal in length to the length of the body 4 and is approximately of half the width thereof. The rod 8 is journaled in suitable bearings provided upon the lower portion of the frame 1 of the gin. An arm 9 is fixed to the rod 8. The link 10 is pivotally connected at one end to the arm 9 and at its opposite end to the hinged bottom section 7 at a point between the hinge 8' thereof and the free end thereof. The rod 8 is provided with a handle portion 11 by means of which the said rod may be turned in its bearings.

When the hinged bottom 7 is in alinement with the bottom section 5 the hinged bottom section occupies the same plane as the section 5 and said sections are disposed toward the conveyer 2, but when the handle 11 of the rod 8 is turned so that the links 10 pull the section 7 up out of the plane occupied by the section 5 the said section 7 will be disposed toward the conveyer 3. Consequently when in the last said position, the section 7 will direct any seed which falls upon it into the conveyer 3 and while the said section 7 is in the position first mentioned, it will direct the seed which falls upon it toward the section 5 which in turn will deliver the seed into the conveyer 2.

From the above description it will be observed that a gin of the ordinary construction may be provided with one of the seed chutes as described and a gang of chutes may be operated simultaneously by the rod 11. Thus it will be observed that during the operation of ginning at any time the seed may be directed from the gin to one or other of the conveyers 2 or 3 and that such distribution of the seed may be accomplished by the simple movement of turning the rod 8 through the instrumentality of the handle 11.

What is claimed is:—

In combination with a gin having an outlet and a plurality of conveyers located thereunder, a feed chute for attachment with the frame of the gin comprising a pan body having a fixed bottom section inclined toward one of the conveyers, and a hinged bottom section, said pan sections being located between the conveyer and the outlet of the gin, means for swinging the hinged pan section so that its upper edge will lie beyond one side of the gin outlet, said means also adapted to swing the hinged pan section so that its upper edge will lie beyond the opposite side of the gin outlet, said hinged pan section when in one of the said positions lying in the same plane as that of the fixed pan section, and when in the other said position lying in a plane at an angle to the plane of the fixed pan section and disposed toward that conveyer other than the one toward which the fixed pan section is inclined.

In testimony that I claim the foregoing as my own, I have hereto affixed my signature in the presence of two witnesses.

HENTON L. STORY.

Witnesses:
C. E. HORTON,
CHAS. FISCHER.